(12) United States Patent
Stover

(10) Patent No.: US 7,100,965 B1
(45) Date of Patent: Sep. 5, 2006

(54) MULTI-SECTION LAND VEHICLE COVER

(76) Inventor: Kevin J Stover, 2907 Leotar Cir., Santa Cruz, CA (US) 95062

( * ) Notice: Subject to any disclaimer, the term of this patent is extended or adjusted under 35 U.S.C. 154(b) by 75 days.

(21) Appl. No.: 10/906,452

(22) Filed: Feb. 21, 2005

(51) Int. Cl.
*B60J 7/20* (2006.01)

(52) U.S. Cl. ............................ 296/136.07; 296/136.03
(58) Field of Classification Search ........... 296/136.07, 296/136.08
See application file for complete search history.

(56) References Cited

U.S. PATENT DOCUMENTS

| | | | | |
|---|---|---|---|---|
| 2,243,981 | A | | 6/1941 | Rowan |
| 4,324,427 | A | | 4/1982 | Huang et al. |
| 4,376,546 | A | * | 3/1983 | Guccione et al. ...... 296/136.03 |
| 4,589,459 | A | * | 5/1986 | Lantrip ................... 296/136.03 |
| 4,635,996 | A | * | 1/1987 | Hirose ................... 296/136.07 |
| 4,971,384 | A | | 11/1990 | Baldwin |
| 5,014,758 | A | | 5/1991 | Stinson |
| 5,112,098 | A | * | 5/1992 | Lichtmann ............. 296/136.07 |
| 5,209,545 | A | * | 5/1993 | Slaugh ................... 296/136.07 |
| 5,273,316 | A | | 12/1993 | Infante |
| 5,413,396 | A | | 5/1995 | Posnansky et al. |
| 5,435,362 | A | | 7/1995 | Chiang |
| 5,497,819 | A | * | 3/1996 | Chiang .................. 296/136.01 |
| 5,605,369 | A | * | 2/1997 | Ruiz ..................... 296/136.07 |
| D378,812 | S | * | 4/1997 | Aycock .................... D12/167 |
| 5,845,958 | A | * | 12/1998 | Rudys et al. .......... 296/136.08 |
| 5,890,525 | A | * | 4/1999 | Shores ................... 296/136.02 |
| 5,902,003 | A | | 5/1999 | Hindson |
| 5,984,401 | A | * | 11/1999 | Hannah ................. 296/136.01 |
| 6,017,079 | A | * | 1/2000 | Warner ................. 296/136.07 |
| D425,010 | S | * | 5/2000 | Lowe ........................ D12/216 |
| 6,099,067 | A | * | 8/2000 | Butterworth ........... 296/136.07 |
| 6,491,335 | B1 | * | 12/2002 | Cohill ................... 296/136.07 |
| D511,132 | S | * | 11/2005 | Stover ........................ D12/401 |
| 2001/0007395 | A1 | * | 7/2001 | Gentile ........................ 296/136 |
| 2003/0057730 | A1 | * | 3/2003 | De Laney .................... 296/136 |
| 2005/0093332 | A1 | * | 5/2005 | Thrasher et al. ....... 296/136.02 |

\* cited by examiner

*Primary Examiner*—Kiran B. Patel
(74) *Attorney, Agent, or Firm*—Donald R. Schoonover

(57) ABSTRACT

A cover includes a plurality of sections and can be attached to a land vehicle using anchor straps. The sections of the cover are attached to each other using connecting straps. The cover can be used when the land vehicle is in use.

2 Claims, 3 Drawing Sheets

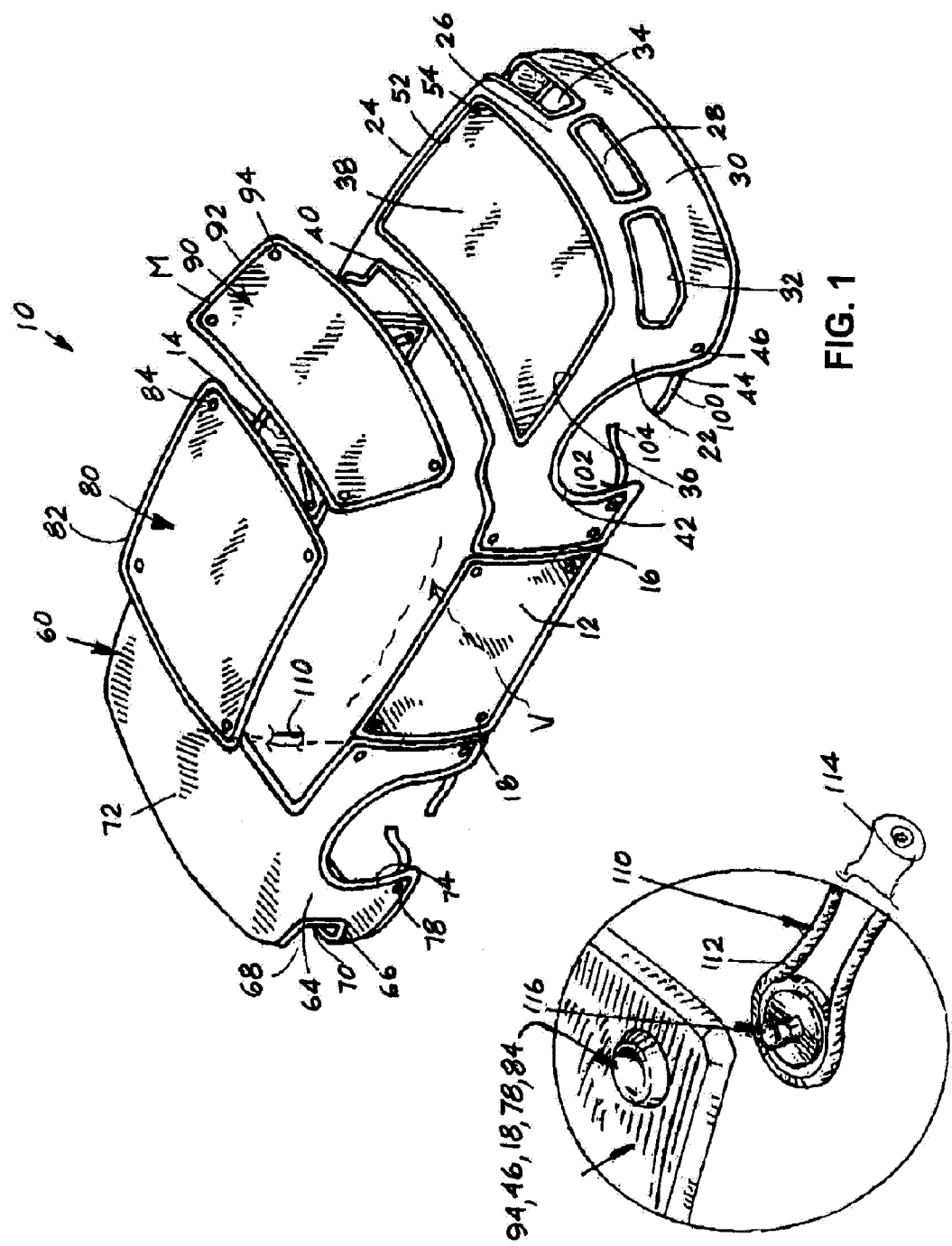

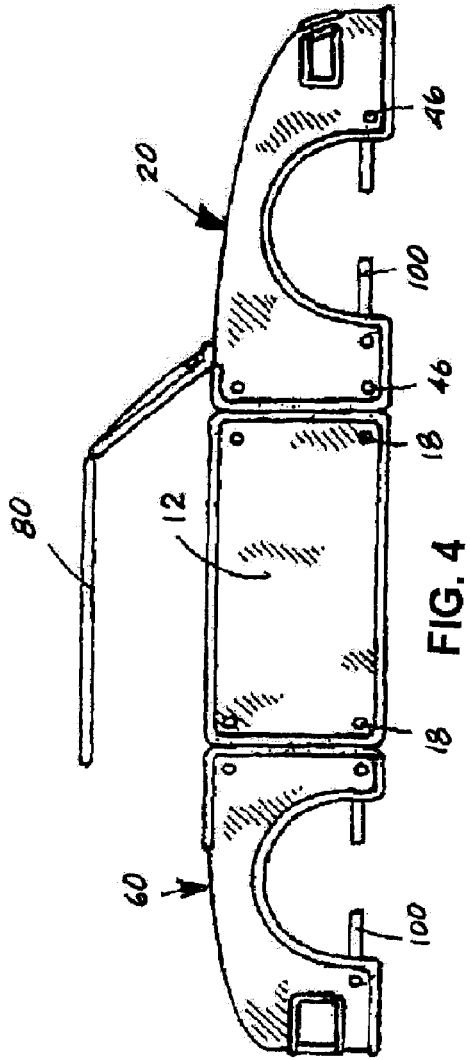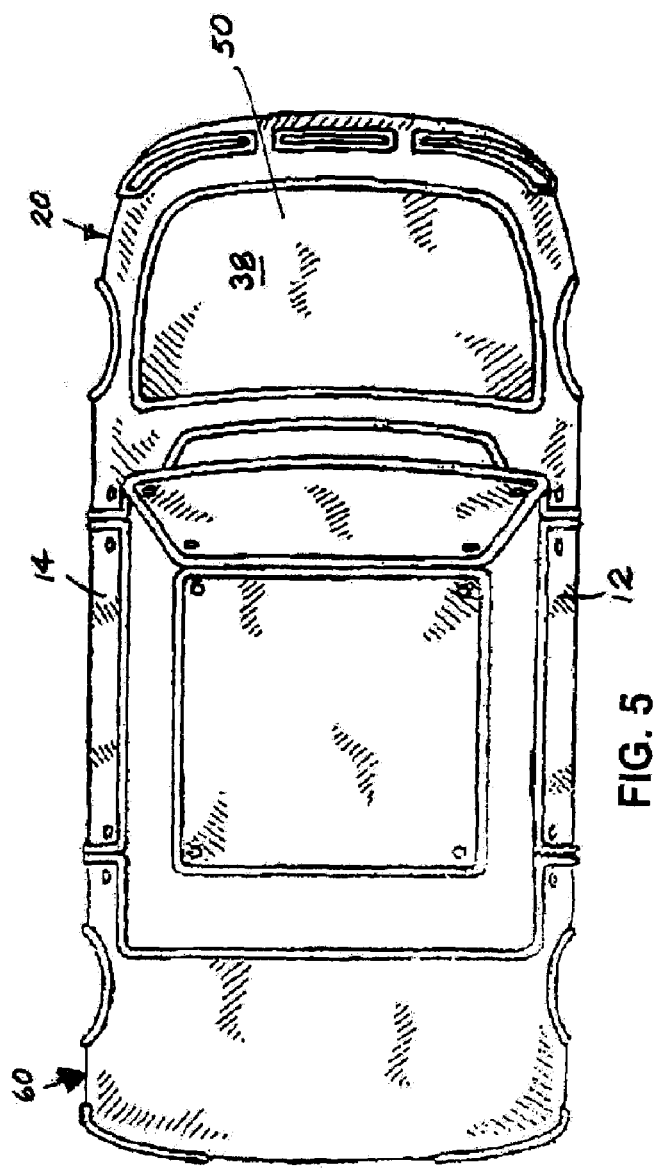

MULTI-SECTION LAND VEHICLE COVER

BACKGROUND OF THE INVENTION

The present invention relates to the general art of land vehicles, and to the particular field of mats and covers for land vehicles.

Many people take great pride in their automobile. These people often go to great lengths to maintain their vehicle in top operating condition. These people also often go to great lengths to keep their vehicle looking good.

A vehicle's finish can be damaged by many factors. The environment can be quite punishing to the finish of any vehicle that is left uncovered for any significant periods of time. Sun, wind, rain, snow, sleet and, of course, hail, can damage the finish of an automobile. Not everyone can store their vehicle inside. Accordingly, the art includes many examples of portable covers for automobiles.

However, the finish of an automobile can also be damaged while the vehicle is in operation. Rocks, grit, and the like, can impinge on the finish of an automobile and mar that finish. However, the inventor is not aware of any cover that can be used to protect the finish of an automobile both while the vehicle is being stored and while the vehicle is being operated.

Therefore, there is a need for a cover for a land vehicle that can be used for either storing the vehicle or protecting the vehicle while it is being operated.

Off roading has become a very popular activity. In this activity, the vehicle is driven in areas that generally do not have roads. While this is an attractive pastime, a vehicle operated in this manner is subjected to extreme conditions. In addition to the above-mentioned hazzards, the vehicle often becomes covered with mud and grime during this activity. This mud and grime must be removed if the finish of the vehicle is to be protected. However, the inventor is not aware of any cover that can be used to protect a vehicle during operation of the vehicle in a manner that might expose the vehicle to extreme conditions, as might be found during an off road experience. Since some of the attraction of such activity is the high speed nature of the operation, any cover that is used must be securely fastened to the vehicle to withstand the conditions to which the vehicle and the cover will be exposed. However, in order to be efficient, the cover must be easily removed for cleaning, or the advantages associated with the cover may be vitiated.

Therefore, there is a need for a cover for a land vehicle that can be used to protect the vehicle while the vehicle is being operated in an environment that may include dirt, grit or other objects that may damage the finish of the vehicle. There is a further need for a cover for a land vehicle that can be used to protect the vehicle while the vehicle is being operated at high speeds and will remain in place during such operation, yet will be easy to remove.

Still further, since not all vehicles are the same, and not all uses of the same vehicle are the same, the most efficient use of a cover will be realized if the cover can be modified to fit a large variety of vehicles, or to change for different uses of the same vehicle.

Therefore, is a need for a cover for a land vehicle that can be used to protect the vehicle while the vehicle is being operated at high speeds and will remain in place during such operation, yet will be easy to modify.

Still further, a vehicle owner may want access to various portions of the vehicle, such as the trunk or the engine. With presently-available covers, the entire cover must be removed to obtain access to some parts of the vehicle. The cover must then be replaced for use. This can be cumbersome and time consuming.

Therefore, there is a need for a cover for a vehicle that can be adapted and modified as necessary to provide efficient access to certain portions of the vehicle while still protecting the finish of the vehicle.

PRINCIPAL OBJECTS OF THE INVENTION

It is a main object of the present invention to provide a cover for a land vehicle that can be used for either storing the vehicle or protecting the vehicle while it is being operated.

It is another object of the present invention to provide a cover for a land vehicle that can be used to protect the vehicle while the vehicle is being operated in an environment that may include dirt, grit or other objects that may damage the finish of the vehicle.

It is another object of the present invention to provide a cover for a land vehicle that can be used to protect the vehicle while the vehicle is being operated at high speeds and will remain in place during such operation.

It is another object of the present invention to provide a cover for a land vehicle that can be used to protect the vehicle while the vehicle is being operated at high speeds and will remain in place during such operation yet will be easy to remove.

It is another object of the present invention to provide a cover for a land vehicle that can be used to protect the vehicle while the vehicle is being operated at high speeds and will remain in place during such operation yet will be easy to modify as needed.

It is another object of the present invention to provide a cover for a vehicle that can be adapted and modified as necessary to provide efficient access to certain portions of the vehicle while still protecting the finish of the vehicle.

SUMMARY OF THE INVENTION

These, and other, objects are achieved by a multi-section cover for a land vehicle which comprises a one-piece vehicle front-covering section which includes an area that will be located adjacent to an engine hood of a land vehicle when the vehicle front-covering section is in place, the one-piece vehicle front cover including two front side panel-covering sections; a one-piece rear-covering section, the rear covering section including two rear side panel-covering sections, each rear side panel-covering section including an open area that will be located adjacent to a rear wheel of the vehicle when the rear-covering section is in place; two door-covering sections; a roof-covering section; an engine hood-covering section; a windshield-covering section; a plurality of snap fasteners on each covering section; a plurality of anchor straps, each anchor strap having a first end and a second end, with the first end of each anchor strap being fixed to a side panel-covering section and the second end of each anchor strap being adapted to be securely fastened to the vehicle; and a plurality of covering section-connecting straps which are adapted to couple one covering section to an adjacent covering section, each connecting strap including a first end and a second end and a snap element on each end, the snap elements of the connecting straps being sized to couple to a snap fastener on a covering section.

The cover embodying the present invention can be used to protect a land vehicle that is being stored, or can be used on a moving land vehicle to protect the finish of that vehicle against hazzards that might be encountered while driving.

This is especially helpful if the vehicle is being operated off road. The one-piece nature of portions of the cover permits the cover to be securely fastened to the vehicle and to remain in place even if the vehicle is moving at high speeds. The multi-section nature of the cover of the present invention permits the cover to be modified for a particular use or for a particular vehicle, and also allows access to various portions of the vehicle as required without removing or modifying the entire cover.

BRIEF DESCRIPTION OF THE DRAWING FIGURES

FIG. 1 is a perspective view of a multi-section cover for a land vehicle embodying the present invention.

FIG. 4 is a right side elevational view thereof, the left side elevational view being a mirror image of the right side elevational view.

FIG. 5 is a top plan view thereof.

FIG. 7 shows a portion of a cover section-connecting strap which is included in the multi-section cover embodying the present invention.

DETAILED DESCRIPTION OF THE PREFERRED EMBODIMENT

Figure 3:
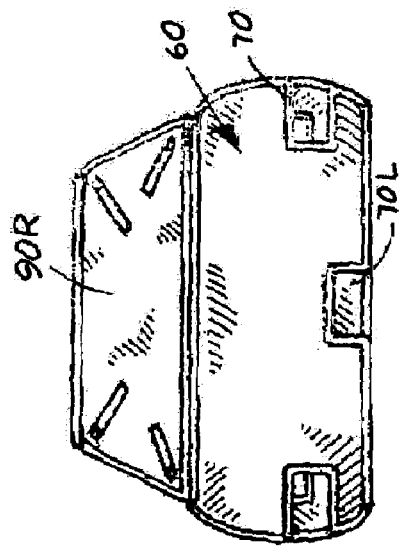
FIG. 3 is a rear elevational view thereof.
Figure 2:
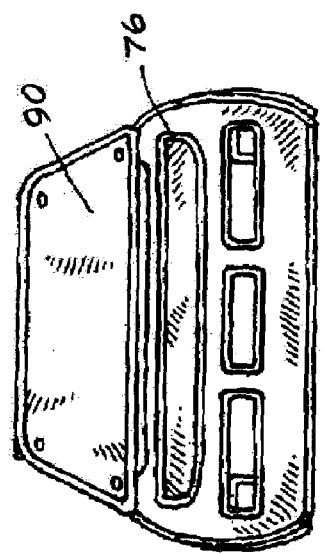
FIG. 2 is a front elevational view thereof.
Figure 6:
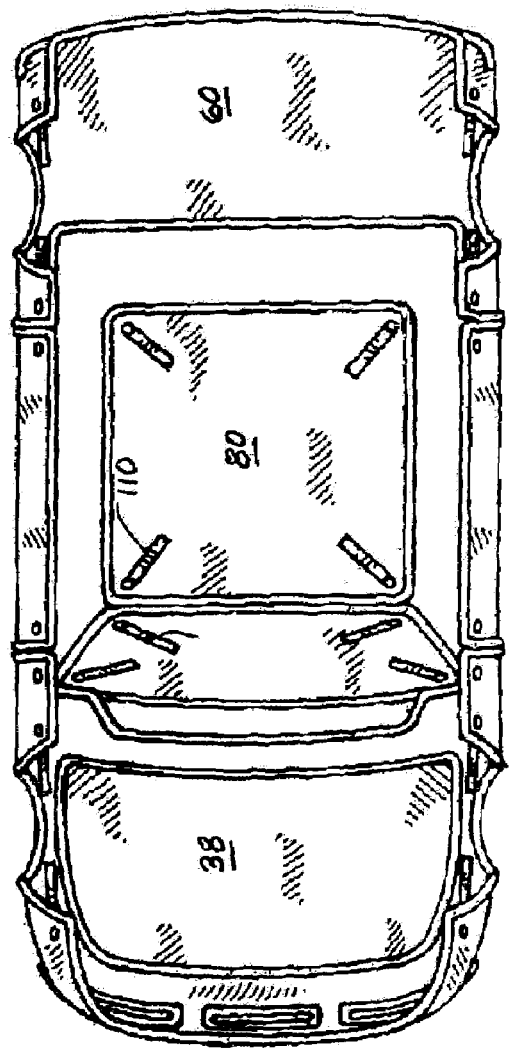
FIG. 6 is a bottom plan view thereof.

Other objects, features and advantages of the invention will become apparent from a consideration of the following detailed description and the accompanying drawings.

Referring to the Figures, it can be understood that the present invention is embodied in a multi-section cover 10 for a land vehicle V such as an automobile, or the like. Cover 10 comprises two door-covering sections 12 and 14. Each door-covering section 12, 14 includes a perimeter, such as perimeter 16 of door-covering section 12, and snap fastener elements, such as snap fastener element 18 on covering section 12, located adjacent to the perimeter 16 of each door-covering section 12. The snap fastener elements 18 are shown near the corners of the covering sections, but could be in any other convenient location without departing from the scope of the present disclosure. Preferably, openings are provided through section 12 and other sections, as appropriate, for door handles, etc.

Cover 10 further includes a vehicle front-covering section 20. Covering section 20 is one-piece so it can withstand high wind forces if the cover is used on a moving vehicle. Covering section 20 includes two front side panel-covering sections 22 and 24, a front grille-covering section 26, an opening 28 in the front grille-covering section 26 for air access to the engine of the vehicle, and a front bumper-covering section 30. A plurality of open areas 32 and 34 are located to be adjacent to front headlights of the vehicle when the vehicle front-covering section 30 is in place on the vehicle.

Covering section 20 includes an engine compartment-covering area 36 which is opened for access to the engine compartment of the vehicle and which is covered by a covering section 38 when desired.

Covering section 20 further includes a covering section 40 that will be located immediately adjacent to a base of a windshield of the vehicle when the vehicle front-covering section 20 is in place on the vehicle.

A wheel area, such as wheel area 42, is located in each front side panel-covering section 22, 24. The wheel area 42 in each front side panel-covering section 22, 24 is positioned to be adjacent to a front wheel of the vehicle when the vehicle front-covering section 20 is in place.

The front-covering section includes a perimeter 44, and snap fastener elements, such as snap fastener element 46, are located on the vehicle front-covering section 20 adjacent to the perimeter 44 of the vehicle front-covering section 20.

An engine hood-covering section 50 is held in place on the front-covering section 20 to cover the vehicle hood and includes a perimeter 52 and snap fastener elements, such as snap fastener element 54, located adjacent to the perimeter 52 of the engine hood-covering section 50.

Cover 10 further includes a vehicle rear-covering section 60. Vehicle rear-covering section 60 is one piece and includes two rear side panel-covering sections, such as rear side panel-covering section 64, a rear bumper-covering section 66, an opening 68 in the rear bumper-covering section 66, and a plurality of open areas, such as open area 70, located to be adjacent to rear lights of the vehicle when the vehicle rear-covering section 60 is in place on the vehicle. An open area 70L can also be included for a vehicle license plate. Rear-covering section 60 further includes a trunk compartment-covering section 72 and a wheel area, such as wheel area 74, located in each rear side panel-covering section 64. The wheel area 74 in each rear side panel-covering section 64 is positioned to be adjacent to a rear wheel of the vehicle when the vehicle rear-covering section is in place.

The rear-covering section has a perimeter 76 and snap fastener elements, such as snap fastener element 78, located on the vehicle rear-covering section adjacent to the perimeter 76 of the vehicle rear-covering section.

Cover 10 further includes a roof-covering section 80 that includes a perimeter 82 and snap fastener elements, such as snap fastener element 84, located adjacent to the perimeter 82 of the roof-covering section 80.

A windshield-covering section 90 can be used to prevent ice from forming on the windshield while the vehicle is parked, and can also be tinted to protect the interior of the vehicle. Windshield-covering section 90 includes a perimeter 92 and snap fastener elements, such as snap fastener element 94, located adjacent to the perimeter 92 of the windshield-covering section 90. A rear window-covering section 90R also included in cover 10 is similar to section 90.

A plurality of anchor straps, such as anchor strap 100, are used to securely anchor cover 10 to the vehicle. As can be understood from the teaching of this disclosure, with the anchor straps 100 in place, each part of cover 10 can be anchored to the vehicle via adjacent sections. Each anchor strap 100 has a first end 102 and a second end 104. The first end 102 of each anchor strap 100 is fixed to a side-panel covering section as by snap elements such as discussed herein, and the second end 102 of each anchor strap 100 is adapted to be securely fastened to the vehicle.

A plurality of cover section-connecting straps, such as connecting strap 110 shown in FIGS. 1 and 7, are adapted to couple one covering section to an adjacent covering section. Each connecting strap includes a first end 112, a second end 114, and a snap element, such as snap element 116, on each end. The snap elements 116 of the connecting straps 110 are sized to couple to a snap fastener on a covering section.

As mentioned above, cover 10 can be customized to fit a particular vehicle or a particular need by including or deleting sections of the cover. The connecting straps 110 and the anchor straps 100 are used to attach the cover sections to the vehicle and to each other as needed. The cover 10 can have magnetic portions to further anchor the cover 10 on the vehicle and can be made of any suitable material. The magnetic portions are most suitably located near the perimeters of the sections, such as magnetic portion M on the windshield-covering section 90. Suitable openings in cover 10 and the sections thereof can be made to accommodate antennas, door handles, moldings, roof racks and other accessories. Buckles can also be used in place of the snap elements discussed above. The anchors 100 and straps 110 will hold the cover in place even if the vehicle is driven at high speed so no air can flow between the cover and the vehicle.

It is to be understood that while certain forms of the present invention have been illustrated and described herein, it is not to be limited to the specific forms or arrangements of parts as described and shown.

What is claimed is:

1. A multi-section cover for a land vehicle comprising:
  a) two door-covering sections, each door-covering section including a perimeter and snap fastener elements located adjacent to the perimeter of each door-covering section;
  b) a vehicle front-covering section, said vehicle front-covering section being one-piece and including
    (1) two front side panel-covering sections,
    (2) a front grille-covering section,
    (3) an opening in the front grille-covering section,
    (4) a front bumper-covering section,
    (5) a plurality of open areas located to be adjacent to front headlights of the vehicle when said vehicle front-covering section is in place on the vehicle,
    (6) an engine compartment-covering area,
    (7) a covering section that will be located immediately adjacent to a base of a windshield of the vehicle when said vehicle front-covering section is in place on the vehicle,
    (8) a wheel area located in each front side panel-covering section, the wheel area in each front side panel-covering section being positioned to be adjacent to a front wheel of the vehicle when said vehicle front-covering section is in place,
    (9) a perimeter of said vehicle front-covering section, and
    (10) snap fastener elements located on said vehicle front-covering section adjacent to the perimeter of said vehicle front-covering section;
  c) an engine hood-covering section that includes a perimeter and snap fastener elements located adjacent to the perimeter of said engine hood-covering section;
  d) a vehicle rear-covering section, said vehicle rear-covering section being one piece and including
    (1) two rear side panel-covering sections,
    (2) a rear bumper-covering section,
    (3) an opening in the rear bumper-covering section,
    (4) a plurality of open areas located to be adjacent to rear lights of the vehicle when said vehicle rear-covering section is in place on the vehicle,
    (5) a trunk compartment-covering section,
    (6) a wheel area located in each rear side panel-covering section, the wheel area in each rear side panel-covering section being positioned to be adjacent to a rear wheel of the vehicle when said vehicle rear-covering section is in place,
    (7) a perimeter of said vehicle rear-covering section, and
    (8) snap fastener elements located on said vehicle rear-covering section adjacent to the perimeter of said vehicle rear-covering section;
  e) a roof-covering section including a perimeter and snap fastener elements located adjacent to the perimeter of said roof-covering section;
  f) a windshield-covering section, said windshield-covering section including a perimeter and snap fastener elements located adjacent to the perimeter of said windshield-covering section;
  g) a plurality of anchor straps, each anchor strap having a first end and a second end, with the first end of each anchor strap being fixed to a side panel-covering section and the second end of each anchor strap being adapted to be securely fastened to the vehicle; and
  h) a plurality of covering section-connecting straps which are adapted to couple one covering section to an adjacent covering section, each connecting strap including a first end and a second end and a snap element on each end, the snap elements of said connecting straps being sized to couple to a snap fastener on a covering section.

2. A multi-section cover for a land vehicle comprising:
  a) a one-piece vehicle front-covering section which includes an area that is located adjacent to an engine hood of a land vehicle when said vehicle front-covering section is in place, said one-piece vehicle front-covering section including two front side panel-covering sections;
  b) a one-piece rear-covering section, said rear-covering section including two rear side panel-covering sections, each rear side panel-covering section including an open area that will be located adjacent to a rear wheel of the vehicle when said rear-covering section is in place;
  c) two door-covering sections;
  d) a roof-covering section;
  e) an engine hood-covering section;
  f) a windshield-covering section;
  g) a plurality of snap fasteners on each covering section;
  h) a plurality of anchor straps, each anchor strap having a first end and a second end, with the first end of each anchor strap being fixed to a side panel-covering section and the second end of each anchor strap being adapted to be securely fastened to the vehicle; and
  i) a plurality of covering section-connecting straps which are adapted to couple one covering section to an adjacent covering section, each connecting strap including a first end and a second end and a snap element on each end, the snap elements of said connecting straps being sized to couple to a snap fastener on a covering section.

\* \* \* \* \*